United States Patent [19]
Culley

[11] 3,725,659
[45] Apr. 3, 1973

[54] THERMOLUMINESCENCE DOSIMETER SYSTEM

[75] Inventor: John C. Culley, Idaho Falls, Idaho

[73] Assignee: The United States of America as represented by the United States Atomic Energy Commission

[22] Filed: Mar. 16, 1971

[21] Appl. No.: 124,686

[52] U.S. Cl. ................................................ 250/71 R
[51] Int. Cl. ................................................ G01t 1/11
[58] Field of Search ............. 250/71 R, 83 PH, 219 D

[56] References Cited

UNITED STATES PATENTS

| | | | |
|---|---|---|---|
| 3,484,605 | 12/1969 | Attix | 250/71 R |
| 3,053,983 | 9/1962 | Faulkner, Jr. et al. | 250/83 PH |
| 3,474,234 | 10/1969 | Rieger et al. | 250/219 D X |
| 3,419,720 | 12/1968 | Debye et al. | 250/71 R X |

Primary Examiner—James W. Lawrence
Assistant Examiner—Davis L. Willis
Attorney—Ronald A. Anderson

[57] ABSTRACT

A system for obtaining radiation spectrum information utilizing a single thermoluminescent (TL) dosimeter. After subjecting the single TL dosimeter to radiation in a manner so that a plurality of areas of the dosimeter experience radiation exposures which differ from each other, such as by overlaying the dosimeter with one or more radiation filters, at least a portion of the individual areas of differing radiation exposure are individually heated to thermoluminescence while the emitted light is observed. The information on the light emitted from the individual areas is then utilized to unfold the characteristics of the radiation to which the dosimeter was exposed.

2 Claims, 3 Drawing Figures

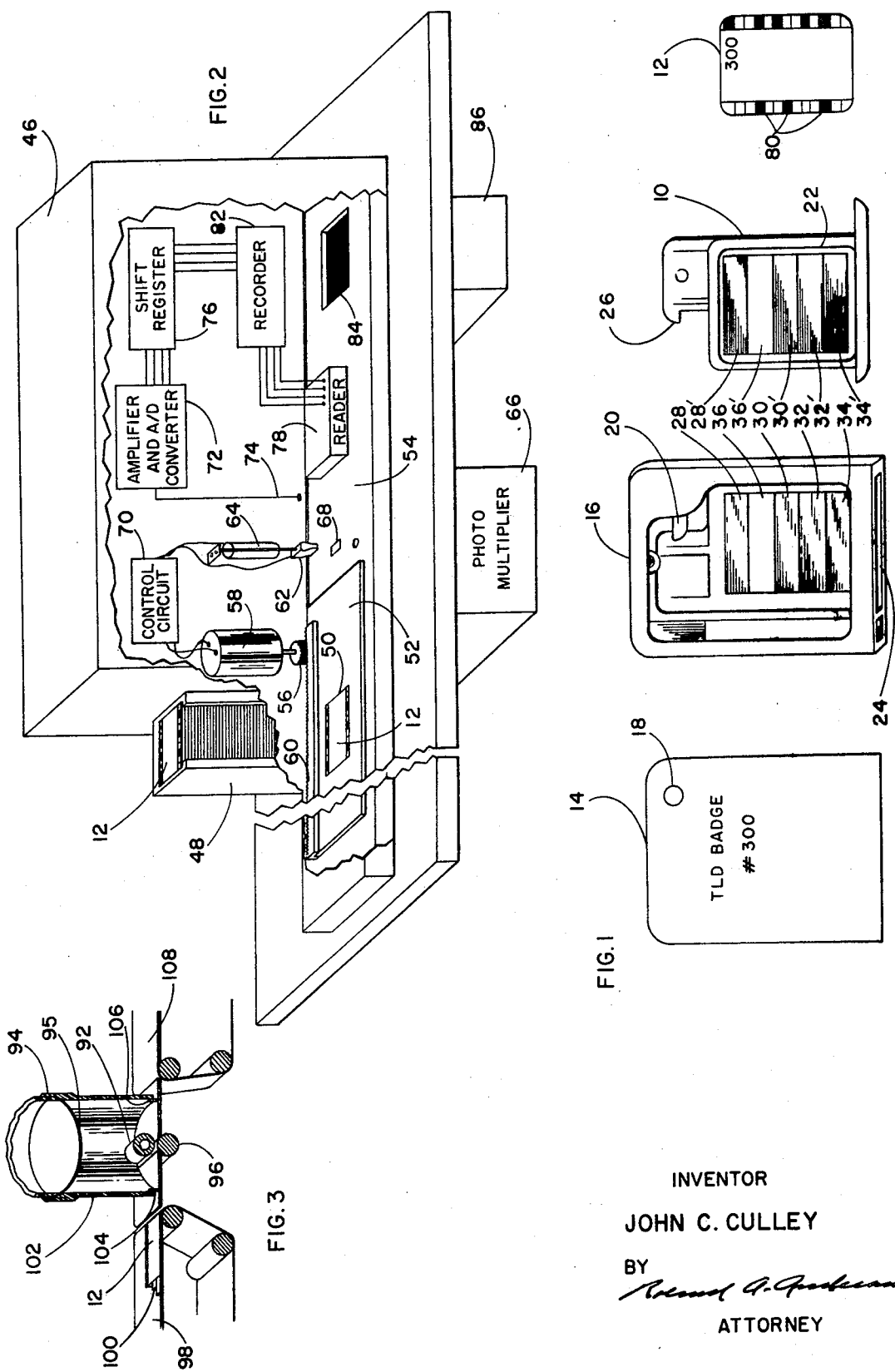

THERMOLUMINESCENCE DOSIMETER SYSTEM

BACKGROUND OF THE INVENTION

The invention described herein was made in the course of or under employment with the U. S. Atomic Energy Commission.

This invention relates to radiation dosimetry and more particularly to a thermoluminescence dosimetry system which greatly facilitates obtaining information on the quantity and energy spectrum of the radiation to which the dosimeter was subjected.

The use of thermoluminescent (TL) materials to obtain radiation exposure dose information is now well known. Briefly, TL dosimetry is based upon the phenomena that certain crystalline materials—generally referred to as phosphors—absorb energy when subjected to ionizing radiation, store the energy—apparently in their crystalline structures—and release the stored energy as light when heated to some higher temperature. In the case of phosphors such as of LiF, $Li_2B_4O_7$:Mn, $CaF_2$:$Mn_2$, $CaF_2$:natural and $CaSO_4$:Mn, the total light emitted is proportional to the radiation dose over a very wide range. The typical usable dose range of these TL phosphors extends over seven orders of magnitude up to $10^5$R, whereas, for comparison, the upper limit for photographic film type dosimeters is generally placed at around 600R.

Since their first use in dosimetry applications, TL phosphors have been incorporated into dosimeters in a number of different forms. Early TL dosimeters used phosphors in loose powder form and TL powder is still used in dosimeters of a variety of different types, although handling powder does present some inconveniences. "Radio tube" type dosimeters, where the TL phosphor powders are cemented onto a filament which is enclosed in a glass envelope, have achieved some popularity. Within the past 10 years or so, phosphors have been compacted or extruded to provide TL dosimeters of solid form. Also, dosimeters which utilize TL phosphors applied to a substrate or incorporated in a matrix of a plastic material, i.e., a synthetic organic polymer, have been developed.

One such TL-plastic material is the LiF and polyimide-acid plastic combination disclosed in U.S. Pat. No. 3,427,452 issued Feb. 11, 1969, in the name of William J. Hartin, assignor to the United States of America as represented by the U. S. Atomic Energy Commission. Another material of this general type comprises LiF incorporated in the synthetic resin polymer material, polytetrafluoroethylene, commonly known and sold under the trademark Teflon. The use of this latter TL-plastic material in personnel dosimetry in an application in which I personally participated is described in the paper entitled "Personnel Dosimetry using Thermoluminescent Dosimeters" by John P. Cusimano and Foster V. Cipperley, *The Health Physics Journal*, Vol. 14 pp. 339–344 (1968). This paper describes a dosimetry badge, originally designed for the use of film, which was converted to a TL dosimeter by the use of two TL-Teflon disks instead of the film packet.

It is often required that a dosimetry system provide some information on the spectrum of the energy of the radiation to which the dosimeter was subjected, as well as the total quantity of that radiation, in order that the penetrating ability of the radiation can be determined. For instance, since beta particles have low penetrating ability, it is often of importance to be able to determine what portion of the total radiation received was due to these low energy particles. Also, it is often necessary, or at least very helpful, to be able to obtain directly a reading on that quantity of the radiation received which was above the energy level necessary to reach certain critical human organs. In the photographic film type dosimeter spectral information may be obtained quite conveniently—within the limits of its more limited useful range mentioned earlier and other limitations not necessary to elaborate on here—by merely overlaying successive portions of the film packet with different radiation filters. Each filter prevents radiation below a particular energy threshold or of a particular type from reaching the film. Application of well-known mathematical unfolding techniques to the densities of the radiation seen by the film under each filter provides the desired spectral information. Accordingly, with the photographic film type dosimeter all of the raw data needed for reconstructing the information with respect to both the quantity and the spectrum of the radiation seen by the dosimeter can be obtained from examination of a single piece of evidence, i.e., the exposed film.

In the case of TL dosimetry, however, heretofore it had been thought that it was necessary to use a number of individual pieces of TL material (or a number of individual dosimeters) in order to obtain the raw data that would be necessary if spectral information were required. After exposure to radiation, each individual piece of TL material was individually raised to thermoluminescence, the individual readout information obtained, and then these individual items of information correlated and unfolded to obtain the necessary information on the characteristics of the radiation received by one person. Accordingly, the use of TL dosimeters required the handling, correlation and analysis of a plurality of individual, data-containing items in order to obtain the same type of information that was obtained from analysis of a single piece of photographic film in the film type dosimeter. This added complexity often resulted in a compromise being made in the number of TL materials and filters used in TL dosimetry and, consequently, in the information obtained on the spectrum. In this regard, it will be noted that in the TL dosimeter described in the above referenced Cusimano and Cipperley paper, only one filter, the cadmium filter, and one open window were utilized whereas previously when the same dosimeter badge was used with photographic film, aluminum and silver filters were utilized in addition to the cadmium filter and open window.

Contrary to these earlier TL systems utilizing a number of TL dosimeter pieces, I have discovered a highly satisfactory TL dosimetry system which requires exposure of only a single TL dosimeter to provide both radiation dose and spectral information.

SUMMARY OF THE INVENTION

It is an object of this invention to provide a TL dosimetry system, and a TL dosimeter and TL dosimeter readout apparatus utilized therewith, which enables radiation dose and spectrum information to be obtained from a single TL dosimeter. Briefly summarized, I have found that the above and additional objects and advantages may be accomplished by making use of the phenomena that a single TL dosimeter may be subjected to radiation in a manner whereby a plurality of areas of the dosimeter experience radiation exposures which differ from each other, and information may be obtained from each of the areas by individually heating a portion, or portions, of them to thermoluminescence while observing the photon energy emitted thereby. The information obtained from the individual areas may then be used to unfold information with respect to the radiation to which the dosimeter was subjected. The areas of differing radiation exposure may be obtained by subjecting the TL dosimeter to a nonuniform radiation field such as by laying a relatively small radioactive wire on it, or may be created by overlaying the TL dosimeter with one or more radiation filters, usually in conjunction with an open window, prior to subjecting it to radiation. As will be more fully appreciated after consideration of preferred embodiments described below, the system of the invention facilitates a highly automated processing of radiation information obtained with TL dosimeters.

BRIEF DESCRIPTION OF THE DRAWING

FIG. 1 illustrates a personnel dosimeter badge for use in the system of the invention with various components shown in a disassembled relationship.

FIG. 2 is a partially broken away, partially block diagram showing of a preferred embodiment of an apparatus for carrying out the system of the invention, and FIG. 3 illustrates another embodiment of the invention, the showing being a sectional view of a portion of an apparatus for use in the system of the invention.

DESCRIPTION OF A PREFERRED EMBODIMENT

Referring now to FIG. 1, a personnel dosimeter badge of a type that may be used in the TL system of the invention is shown with insert frame 10, TL dosimeter (TLD) 12 and front face plate 14 removed from main frame 16. In its assembled position, face plate 14, which may contain a picture of the holder of the badge and/or other identification information and is made of a relatively radiation transparent substance such as polyethylene, constitutes the outer face of the badge.

To complete the assembly of the badge, TLD 12 is inserted into corresponding indentation 22 of insert frame 10 and frame 10 inserted into main frame 16 through opening 24 in the bottom of main frame 16 (after rotation of either insert frame 10 or main frame 16 180° from the positions shown in FIG. 1). When fully inserted, insert frame 10 is securely held within main frame 16 by the action of spring actuated latch 20 on tab 26. In disassembling the badge, release of latch 20 may be accomplished either by use of a magnet on the outside of the badge or by insertion of an appropriate tool through hole 18 in face plate 14.

Both main frame 16 and insert frame 10 have corresponding filters 28, 28'; 30, 30'; 32, 32'; 34, 34'; and open windows 36 and 36' which overlie corresponding areas of the two faces of TLD 12 when the badge is fully assembled. It will be appreciated that the choice of the number of filters and the particular materials from which they are made determines the quantity and quality of the information that can be unfolded regarding the radiation the badge itself receives. A particular choice of materials that is very useful is an open window, 175 mg/cm$^2$ aluminum, 300 mg/cm$^2$ tin, 1,000 mg/cm$^2$ tin, and 1,000 mg/cm$^2$ cadmium. To give some insight on this particular choice of materials, the open window passes all of the radiation (although polyethylene face 14 and the back of main frame 16 provide some filtering action). The aluminum filters out the beta component of the radiation that is passed through the open window while passing essentially all of the gamma component. The 300 mg/cm$^2$ tin filters out gamma radiation below about 25 KeV and the 1,000 mg/cm$^2$ tin filters out gamma below about 50 KeV. The cadmium, while passing essentially the same energy gamma passed by the tin filter of the same density, will also produce additional gamma by reaction with the thermal neutron component of the radiation received. Accordingly, analysis of the radiation actually seen by the five zones into which the four filters and open window divide TLD 12 provides a relatively good basis for unfolding the characteristics of the radiation the badge received. A more complete, or less complete, characterization of that radiation can be readily obtained by increasing or decreasing the number, kind and/or shape of filters used with the dosimeter as requirements may dictate. This will be apparent after consideration of the following description regarding method and apparatus for reading out the different zones of a single TLD.

The method and means by which the information is obtained from the various zones of differing actual radiation exposure of a TL dosimeter will now be described in connection with the progress of a TLD 12 through apparatus 46. A number of individual TLDs 12 are loaded into magazine 48 for pickup, one at a time, by the correspondingly shaped window 50 in slide 52. One TLD 12 is shown in position in window 50. Rotation of pinion gear 56 by stepping motor 58 moves rack 60, and therefore slide 52 to which it is attached, longitudinally along base plate 54. Slide 52 is moved until the TLD in window 50 is brought into position for engagement with heater 62. Solenoid 64 is then actuated to bring heater 62 into contact with the upper face of TLD 12. Heater 62 raises the portion of the TLD thereunder to a pre-selected thermoluminescence temperature for the TL material of TLD 12. The thermoluminescence thus emitted is observed by photomultiplier 66 through window 68 in base plate 54. An infrared filter positioned in window 68 blocks any infrared produced by heater 62. The operation of stepping motor 58 and heater 62 is controlled by suitable electrical circuitry 70. An inert atmosphere can be maintained around the dosimeter during the heating and observing step by flushing nitrogen or some other suitable gas onto the dosimeter, or into a chamber, not shown, which can be provided to surround the dosimeter while it is in position under the heater, by gas conducting and delivering means, not shown.

It has been found that the size of the area of the face of TLD 12 which heater 62 contacts, the heater temperature, the length of time the dosimeter dwells under heater 62 as each increment of the dosimeter is heated, and the relative heat conductivity or resistivity, of the materials of TLD 12 are interrelated variables. The objective is to select these variables so that only a predetermined increment of TLD 12 is brought to thermoluminescence during a selected period of time. This permits increments of the individual areas of TLD 12 which received different actual radiation due to filters 28, 30, 32 & 34 and open window 36 to be individually brought to thermoluminescence.

In one specific example utilizing a TLD 12 having thermoluminescent grade LiF dispersed throughout a 0.015 inch thick matrix of polytetrafluoroethylene with the phosphor constituting about 30 percent of the total weight of the dosimeter, the dosimeter was moved past a heater having a surface engaging area of 0.012 by 1 inch in 0.008 inch increments. The temperature of the heater was maintained at 300°C and the dwell of the heater at each increment was 0.33 seconds. Examination of the displays of photomultiplier output obtained when the entire length of the dosimeters was stepped past heater 62 shows that the thermoluminescence observed by the photomultiplier is quite strictly limited to the increment of the dosimeter under the heater during the dwell period. This is particularly apparent in the portions of the displays corresponding to the areas of the dosimeter where successive increments progress from a zone which was overlaid by one filter to the zone which was overlaid by the next adjacent filter. Accordingly, the readout of TLD 12 may be accomplished either by stepping the entire dosimeter past heater 62 or by merely heating one or more increments of each of the areas of differing radiation exposure.

It will be appreciated that a plurality of heater-photomultiplier combinations could be used to read out a plurality of individual areas of the dosimeter simultaneously. Also, in view of the precision with which individual increments are read out, the particular shape or shapes of the filters used are really a matter of choice, it only being necessary that the particular shape be mathematically correlated with the photomultiplier signal in the unfolding computations. As an example, while the use of rectangularly shaped filters, such as shown in FIG. 1, is clearly the most straightforward approach, two such rectangular filters could be replaced by two filters each of which in plan view is one of the triangles formed by dividing a rectangle by its diagonal. With filters of such triangular shape, each increment read out would consist of a portion which was overlaid by one of the filters and a portion which was overlaid by the other. The relative proportion of each represented in successive increments would increase and decrease, respectively, in a readily recognizable mathematical relationship. As long as the unfolding computations took this relationship into account, however, such triangular filters would be a practicable arrangement. Similar considerations can be seen to be applicable when the dosimeter is utilized, with or without filters, to obtain information regarding a non-uniform radiation field.

The electrical signal generated by photomultiplier 66 upon observance of the thermoluminescence transmitted through window 68 is available for x-y plotting and is also fed to an amplifier and analog/digital converter 72 through conductor 74. This digitized information is then fed into shift register 76 which collects the information from each increment of each area of TLD 12 raised to thermoluminescence. TLD 12 is then transported by slide 52 to reader 78 where machine readable identification information 80, which has been imprinted or otherwise placed on the dosimeter, is read. While there are several types of identification reader systems that could be used, one that is thought to be particularly satisfactory employs the division of each of the sides of the dosimeter into three Binary Code Digits. In the machine itself, a lightpipe-photodiode combination observes each of the bit blocks on the dosimeter. The signal generated by the photodiodes is, therefore, directly readable as digital information. It will be noted that in FIG. 2 only a typical array of four wires carrying the signal for just one of the six total digits is shown.

Signals representing the digital information from reader 78 and shift register 76 are then fed to a suitable recording device 82, such as a card punch or magnetic tape writer, where both the identification and radiation readout signals are recorded together ready for further processing to unfold the radiation characteristics for the identified dosimeter, preferably by automatic data processing equipment. TLD 12 is then transported further to the right, as shown in FIG. 2, until it drops out of slide 52 through opening 84 into bin 86 from which a number of TLDs 12 can periodically be collected and returned to service after being subjected to any necessary processing such as annealing, washing, etc. Slide 52 then returns to pick up another TLD 12 from magazine 48 for readout.

The arrangement of FIG. 2 wherein the TL dosimeter is heated on one face and the thermoluminescence emitted from the dosimeter observed from the other face is particularly suitable where the dosimeter utilizes a matrix of a translucent material such as polytetrafluoroethylene. However, the invention is not limited to the use of translucent matrix materials, or for that matter, to the use of matrix materials of any kind since compacted and extruded TL dosimeters would be usable therein. This will be apparent after consideration of the embodiment of FIG. 3, the components of which are shown in sectional view.

In the embodiment of FIG. 3, heat is applied to TLD 12 by passing a hot gas such as nitrogen through a hollow, transparent quartz rod 92 and the emitted thermoluminescence observed by photomultiplier 94, photocathode 95 of which is directly above rod 92. Quartz rod 92 and roller 96 are rotated by means not shown in a manner to move TLD 12 past heater rod 92. It is apparent that in this embodiment, in addition to the heat applied through quartz rod 92 (or in place of it) heat may be applied to the opposite face of TLD 12 through roller 96. Roller 96 may be heated by ohmic or other means. Web conveyor 98 with TLD engaging dog 100 transports the TLD into engagement with rod 92 and roller 96 whereupon the rod and roller transport the TLD through the enclosure formed by shroud 102 and flexible ingress and egress permitting flaps 104 and 106. Web conveyor 108 transports the TLD to its next station, not shown, such as for reading identification information 80. Various electronic control and signal processing circuitry similar to that used with the apparatus of FIG. 2 would be used in this embodiment also.

While the apparatus of FIGS. 2 and 3 are particularly adapted for dosimeters in sheet form, it will be apparent that other forms such as, for example, rods or bars, would be quite satisfactory with, of course, the necessary modifications being made in the particular apparatus used therewith.

While the fundamental novel features of the invention have been shown and described and pointed out as applied to embodiments particularly described and further variations have been suggested and indicated by way of example, it will be readily appreciated by those skilled in the art that various omissions and substitutions and changes may be made within the principle and scope of the invention as expressed in the appended claims.

What is claimed is:

1. In a system for obtaining information on both the spectrum and quantity of a radiation dose utilizing a single thermoluminescence dosimeter, the method comprising:
   a. providing a single dosimeter comprised of a matrix of a non-thermoluminescing material having a uniform density of thermoluminescing material thereover with machine readable identification intelligence thereon,
   b. dividing said dosimeter into at least two individual areas which experience radiation exposures which differ from each other when the dosimeter is exposed to radiation by overlaying at least one of said individual areas with a radiation filter,
   c. exposing said dosimeter to ionizing radiation,
   d. heating, individually, at least one increment of each of said individual areas of differing radiation exposure to thermoluminescence while observing the magnitude of photon energy released thereby with photometering means,
   e. utilizing said observed magnitude of photon energy from said plurality of individual areas to obtain information on the quantity and the spectrum of the radiation dose received by said dosimeter,
   f. machine reading said identification intelligence, and
   g. correlating said radiation dose information with said identification intelligence.

2. The method of claim 1 wherein said matrix is a translucent sheet and said heating and observing step is performed by subjecting said increments to heat applied to one face thereof while observing each of said increments from the other face.

* * * * *